(12) United States Patent
Marshall

(10) Patent No.: US 9,544,277 B1
(45) Date of Patent: Jan. 10, 2017

(54) KAFKA: A CELLULAR AUTOMATION / COMPLEX FIBONACCI SEQUENCES-BASED TECHNIQUE FOR ENCRYPTING AND DECRYPTING AUDIO, VIDEO AND TEXT MESSAGES

(71) Applicant: Roger G Marshall, Plymouth, NH (US)

(72) Inventor: Roger G Marshall, Plymouth, NH (US)

( * ) Notice: Subject to any disclaimer, the term of this patent is extended or adjusted under 35 U.S.C. 154(b) by 0 days.

(21) Appl. No.: 14/756,484

(22) Filed: Sep. 9, 2015

(51) Int. Cl.
| | | |
|---|---|---|
| *H04K 1/00* | (2006.01) | |
| *H04L 29/06* | (2006.01) | |
| *H04W 12/02* | (2009.01) | |
| *H04L 9/00* | (2006.01) | |
| *H04L 9/06* | (2006.01) | |
| *G06T 11/00* | (2006.01) | |
| *G06N 5/00* | (2006.01) | |
| *G06T 9/00* | (2006.01) | |
| *H04L 9/08* | (2006.01) | |

(52) U.S. Cl.
CPC .......... *H04L 63/0435* (2013.01); *H04W 12/02* (2013.01); *G06N 5/006* (2013.01); *G06T 9/00* (2013.01); *G06T 11/00* (2013.01); *G06T 11/006* (2013.01); *H04L 9/001* (2013.01); *H04L 9/0656* (2013.01); *H04L 9/08* (2013.01)

(58) Field of Classification Search
CPC ...... H04L 63/0435; H04L 9/08; H04L 9/0656; H04L 9/001; H04W 12/02; G06T 9/00; G06T 11/00; G06T 11/006; G06N 5/006
USPC .......................... 380/255, 270, 277
See application file for complete search history.

(56) References Cited

U.S. PATENT DOCUMENTS

| | | | | | |
|---|---|---|---|---|---|
| 5,365,589 | A | * | 11/1994 | Gutowitz | H04L 9/001 380/263 |
| 5,677,956 | A | * | 10/1997 | Lafe | G06N 99/005 380/263 |
| 2007/0273408 | A1 | * | 11/2007 | Golic | G06F 7/584 326/93 |
| 2009/0092251 | A1 | * | 4/2009 | Domosi | H04L 9/001 380/255 |

OTHER PUBLICATIONS

"A secure steganographic algorithm based on Cellular Automata using Fibonacci representation", Nguyen et al., Information Science and Applications (ICISA), 2013 International Conference.*

* cited by examiner

*Primary Examiner* — Jayesh Jhaveri

(57) ABSTRACT

A software system which uses a specially designed cellular automaton network to perform symmetric-key encryptions and decryptions of user-supplied input messages. The input messages are in the form of text or images or audio data. A mathematical function based on Fibonacci sequences in the complex domain is used to define interactions among the cells of the cellular automaton network. The outputs of the system are encryptions of the user inputs; a simple key inversion procedure enables the decrypting of the encrypted output. The system permits multiple encryptions of the input and this, in turn, requires multiple decryptions to obtain the original input.

10 Claims, 10 Drawing Sheets
(9 of 10 Drawing Sheet(s) Filed in Color)

Block schematic of the KAFKA Software system

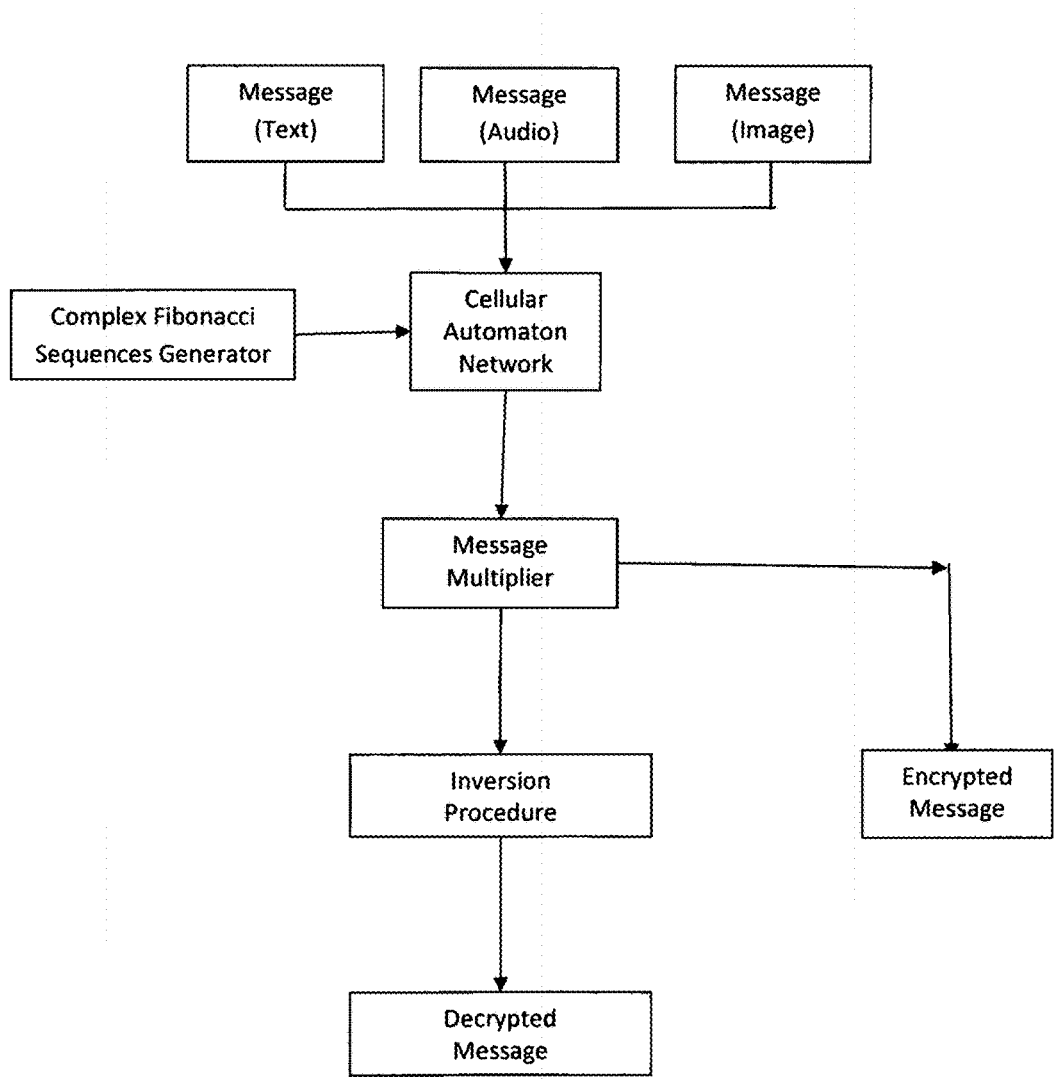
FIGURE1. Block schematic of the KAFKA Software system

Type T Messages (plain text messages)

|  | Example #1 Short message |
|---|---|
| Plain text | This is a very simple message$$$$$$ |
| Encryption Key |  |
| Decryption Key |  |
| Cipher text | ÷ÿÿÅÿÿèÿÿ˜ÿÿÿñÿÐÿÿÿÿÿ˜ÿ&ÿÿ(ÿÿ6ÿÿ |
| Decrypted message | This is a very simple message$$$$$$ |

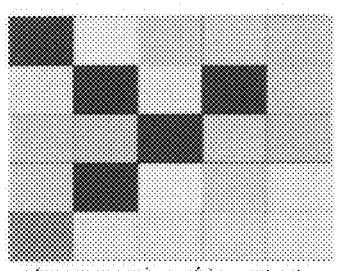
Image version of input text

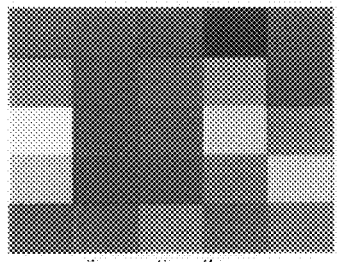
Encryption Key

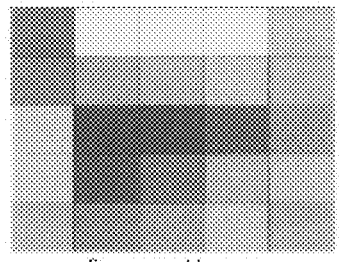
Encrypted Image

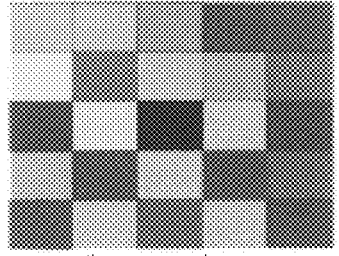
Decryption Key

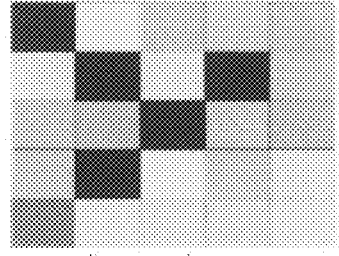
Decrypted Image

FIGURE 2 System output for type T messages – example #1

|  | Example #2<br>Message with repeating elements |
|---|---|
| Plain text | AAAAAAVVVVVVJJJJJ$$$$$$ |
| Encryption Key |  |
| Decryption Key |  |
| Cipher text | yyyyyyyyyyyyyyyyyyyyyyy |
| Decrypted message | AAAAAAVVVVVVJJJJJ$$$$$$ |
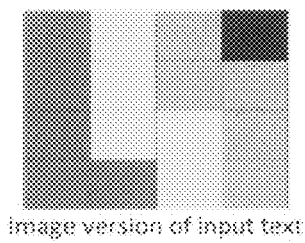
Image version of input text
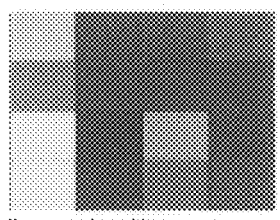
Encryption Key
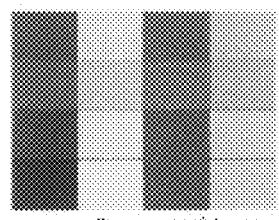
Encrypted Image
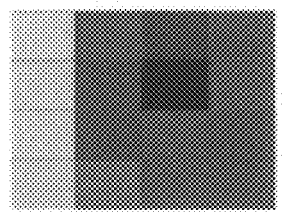
Decryption Key
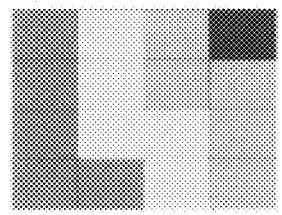
Decrypted Image
FIGURE 3 System output for type T messages – example #2

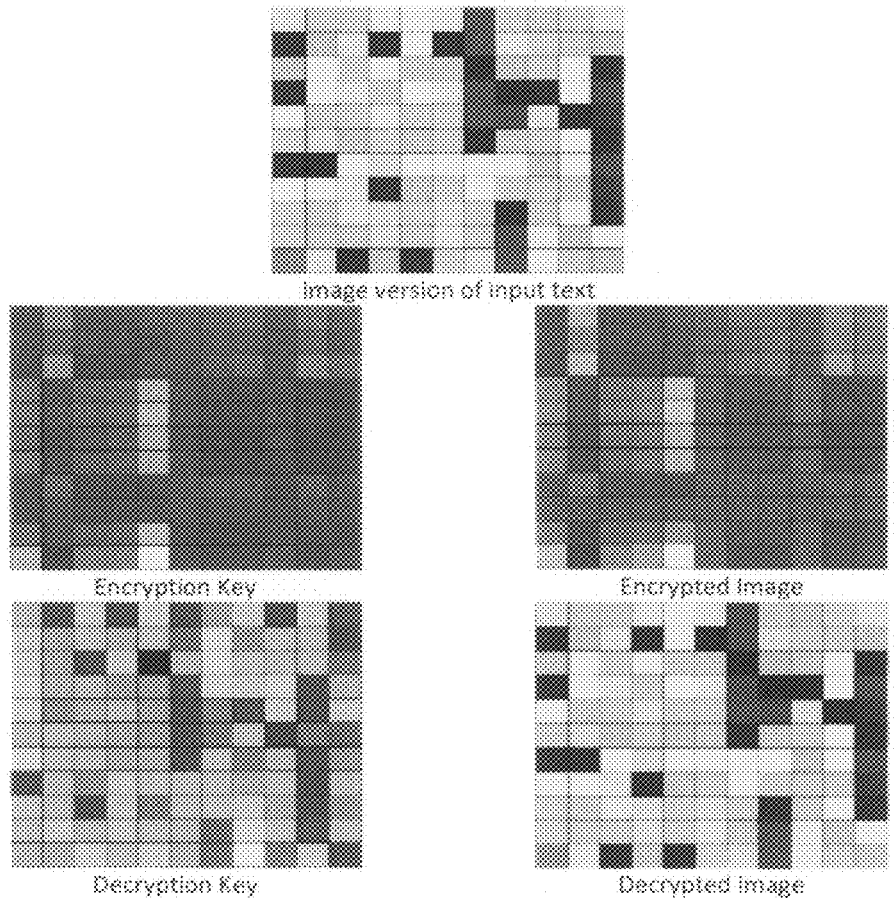
FIGURE 4 System output for type T messages – example #3

Type P Messages (picture messages)
Example #4 (Picture of flowers)
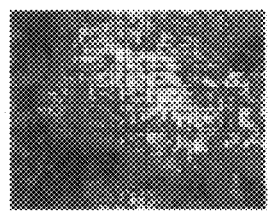
Input Image
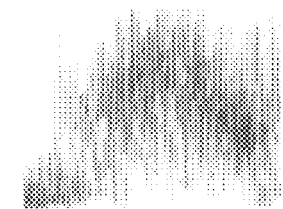
Waveform version of Image
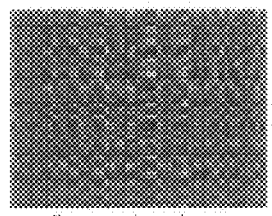
Encryption Key
Encryption Key Waveform
Encrypted Image
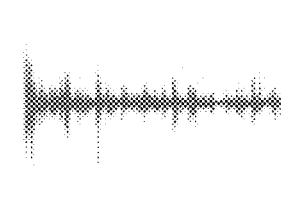
Encrypted Image Waveform
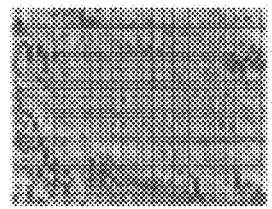
Decryption Key
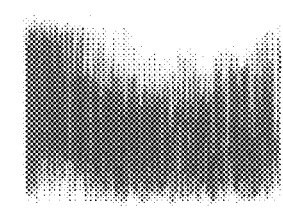
Decryption Key Waveform
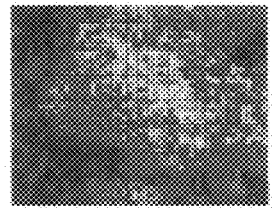
Decrypted Image
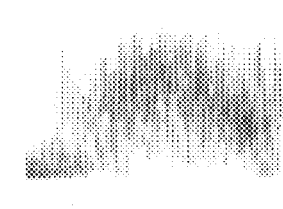
Decrypted Image Waveform
FIGURE 5 System output for type P messages – example #4

Example #5 (Picture of Sonogram)
Input image
Waveform version of Image
Encryption Key
Encryption Key Waveform
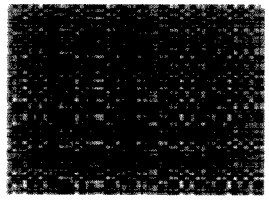
Encrypted Image
Encrypted Image Waveform
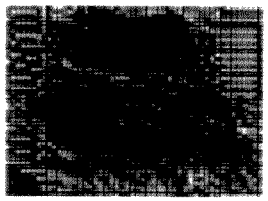
Decryption Key
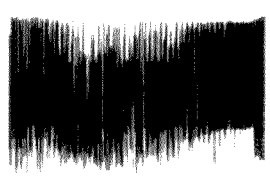
Decryption Key Waveform
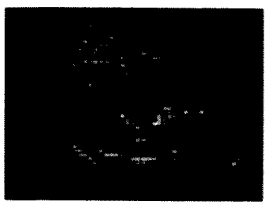
Decrypted Image
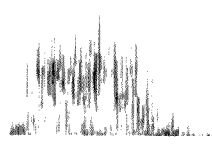
Dencrypted Image Waveform
FIGURE 6 System output for type P messages – example #5

Example #6 (Picture of the 'PLUS' Symbol)
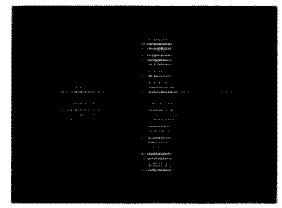
Input image
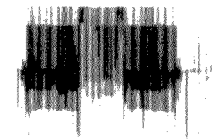
Input image as wave
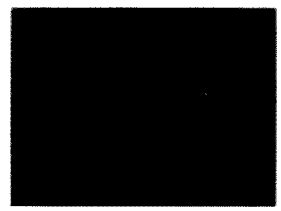
Encryption Key
Encryption Key Waveform
Encrypted Image
Encrypted Image Waveform
Decryption Key
Decryption Key Waveform
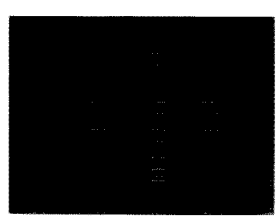
Decrypted Image
Decrypted Image Waveform
FIGURE 7 System output for type P messages – example #6

Type A Messages (Audio Messages)
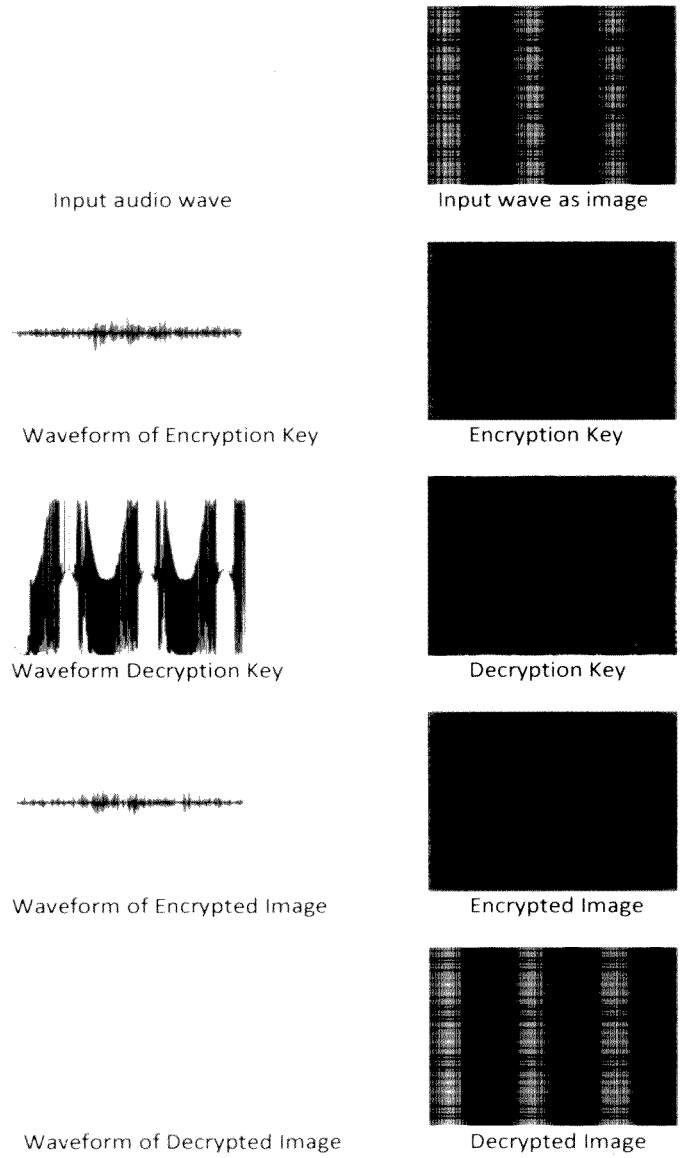
FIGURE 8 System output for type A messages – example #7

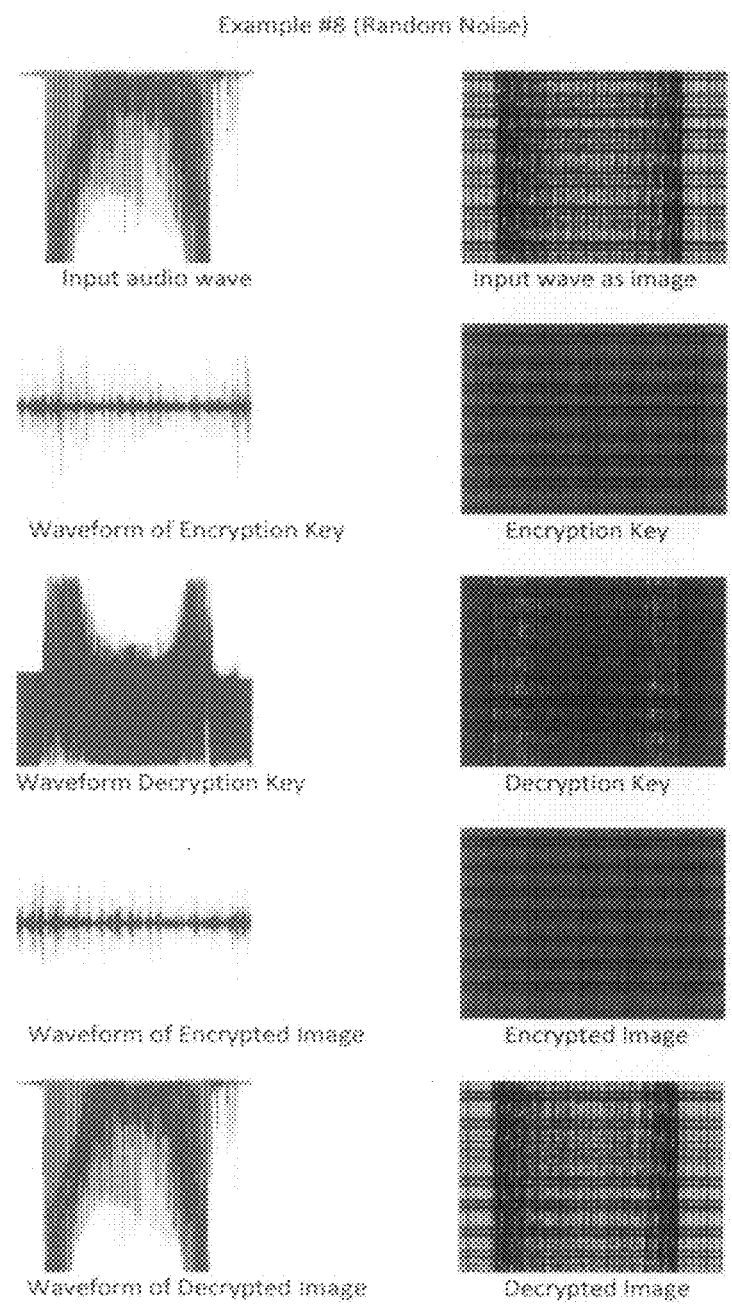
FIGURE 9 System output for type A messages – example #8

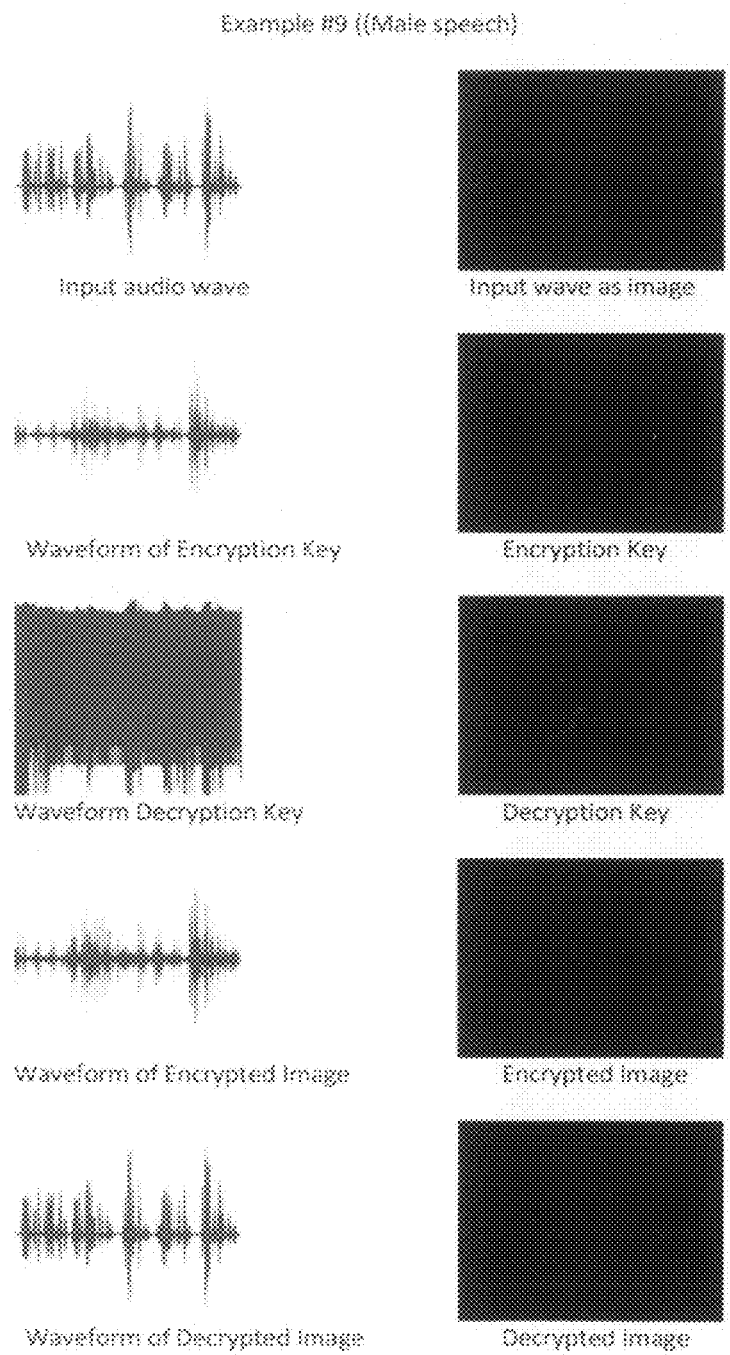
FIGURE 10 System output for type A messages – example #9

US 9,544,277 B1

KAFKA: A CELLULAR AUTOMATION / COMPLEX FIBONACCI SEQUENCES-BASED TECHNIQUE FOR ENCRYPTING AND DECRYPTING AUDIO, VIDEO AND TEXT MESSAGES

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

CROSS-REFERENCE TO RELATED APPLICATIONS

Does not apply

REFERENCE TO TABLE OR COMPUTER PROGRAM LISTING

The specification is accompanied by one TEXT file containing a computer program listing.

BACKGROUND OF THE INVENTION

This invention is in the field of symmetric cryptography. The field of cryptography is concerned with the diverse techniques that are used in facilitating the secure communication of confidential or proprietary information (messages) between two or more entities. Cryptographic techniques may be broadly divided into two categories—i) asymmetric cryptography or public-key cryptography, and ii) symmetric cryptography.

Classical symmetric cryptography is based on either permuting characters in a message or substituting one or more characters in a message with one or more characters from the same alphabet or different alphabets. The key associated with a particular algorithm dictates how the substitutions or transpositions are carried out. The key in the linear algebra-based Hill technique, for example, is an integer-valued matrix. [L. S. Hill. Cryptography in an algebraic alphabet. The American Mathematical Monthly. Vol. 36, pp. 306-312, 1929]. Modern cryptographic algorithms use both substitution and transposition of characters or groups of characters in a message, either directly or indirectly.

In public-key cryptography, the sender (say A) has two keys—a private key A keeps secret, and a public key which is made available to anyone (say B) who wishes to communicate with the sender. If B wishes to send a message to A, B uses A's public key to encrypt the message and A uses his/her private key to decrypt the message. Likewise, if A wishes to send a message to B, A uses B's public key to encrypt the message and send it to B; B then uses his/her private key to decrypt the message. The security of the [public-key, private-key] pair in asymmetric cryptography schemes is predicated on the inability of an intruder to compute the private key in a finite amount of time since key generation is based on obtaining the solution to computationally and mathematically hard problems. Examples of this include the Rivest-Shamir-Adelman (RSA) algorithm which is based on factoring the product of two very large prime numbers; the El Gamal cryptosystem which is based on solving the standard discrete logarithm problem and the Miller-Koblitz elliptic curve cryptographic technique which is based on solving the elliptic curve discrete logarithm problem. All of these techniques are centered on using integers, in particular large prime numbers.

In symmetric cryptography, both the sender and the recipient of a message use the same key in order to encrypt and decrypt the message. Since both the sender and the recipient share the same key, the key will need to be kept secret. However, in case the key falls into the wrong hands, any subsequent communications between the original sender and the intended recipient can be easily compromised. Well known modern symmetric cryptography algorithms include the Data Encryption Standard (DES) and the Advanced Encryption Standard (AES).

One way to prevent subsequent communications from being compromised is to make the key message-specific. Yet, if the key is poorly constructed, knowledge of a key from some prior communication can still be used to infer or partially construct a new key. It has been mathematically proven by Claude Shannon [C. E. Shannon. The synthesis of two-terminal switching circuits. Bell Systems Technical Journal, vol. 28, pp. 59-98, 1948] that the 'one-time pad' technique originally devised and patented by Gilbert Vernam [G. S. Vernam: Secret Signaling System. 1919. U.S. Pat. No. 1,310,719] is completely secure. In the Vernam method, the length of the key is the same as the length of the message and each character in a message is cyclically shifted a random number of positions. The KAFKA System described in this application is also a 'one-time pad' technique but it is significantly different from the Vernam technique. The significant differences are discussed in the section labeled 'Detailed Description of the Invention' under the heading 'Points of particular interest'.

BRIEF SUMMARY OF THE INVENTION

KAFKA is a one-time symmetric cryptographic technique designed to enable internet users to send and receive text messages, audio files and pictures of a confidential nature. Any user message, irrespective of type or format, is first converted into a two-dimensional image. This image is input into a cellular automaton network in which the cells of the network interact using complex Fibonacci sequences. The output of the cellular automaton is an image representation of the encryption key. This key is then used to encrypt the user message. The key and the encrypted message are sent to the intended recipient. The recipient uses a simple inversion technique to generate the decryption key from the encryption key and then uses the decryption key to decipher the encrypted message. Since the encryption key is derived using the input message, this means each encryption is unique to a message; any change to the input message will also in changes to the encryption key—this is the reason why the technique is one-time. An encryption key/decryption key derived from one message cannot be meaningfully applied to some other message. The technique for obtaining the encryption key is based on several user inputs, none of which need be shared with the recipient.

BRIEF DESCRIPTION OF THE SEVERAL VIEWS OF THE DRAWING

"The patent or application contains at least one drawing executed in color. Copies of this patent or patent application publication with color drawing(s) will be provided by the Office upon request and payment of the necessary fee"

The inventor petitions the US Patent Office to permit the usage of color drawings in this patent application since they are absolutely essential to the utility of the invention. Visual discrimination of the differences in software system's output for two or more marginally different inputs is rendered possible only through the employment of various shadings and mixtures of colors; such immediate visual discrimination would not be possible using simple black/white or gray scale images. Moreover, user inputs include color images.

For each type of message that the user wishes to encrypt/decrypt, the KAFKA system generates a set of images.

Text Message: 5 text streams (original text message, encryption key, decryption key, message after encryption, and message after decryption) and 5 images (image representation of original text message, encryption key image, decryption key image, encrypted image, and decrypted image).

Audio Wave Message: 5 audio waveforms (original input audio waveform, waveform of encryption key, waveform of decryption key, waveform of encrypted input audio message, and waveform of decrypted audio message) and 5 images (image representation of original input audio wave, encryption of the image representation of input audio wave, decryption of the image representation of input audio wave, encryption key and decryption key). In addition, the user can listen to the audio files.

Image Message: 5 images (original picture-type message, encryption key image, decryption key image, encrypted image, and decrypted image) and 5 waveforms (waveform of encryption key, waveform of decryption key, waveform of encrypted input image, waveform representation of encrypted image and waveform representation of decrypted image). Here too, the user can listen to the audio files.

For each type of message, three examples are presented. Examples #1, #2 and #3 pertain to text messages (#1 is a short text message, #2 is a short message with repeating letters, and #3 is a long message containing letters, numbers and punctuation symbols); examples #3, #4, and #6 pertain to pictures input as messages (#3 is the picture of flowers, #4 is the image of a sonogram, and #6 is a picture of the plus symbol in a dark background), and examples #7, #8 and #9 are for audio wave messages (#7 is the periodic waveform representing the sound of a siren, #8 is a high frequency random noise wave, and #9 is the waveform representing the speech pattern of a male reciting a portion of the preamble to the US Constitution). The text streams, waveforms and images output by KAFKA for these nine examples are shown in FIGS. 2 through 10, respectively.

LIST OF DRAWINGS

FIG. 1 Block Schematic of the KAFKA Cryptographic System
FIG. 2 System output for type T messages—example #1
FIG. 3 System output for type T messages—example #2
FIG. 4 System output for type T messages—example #3
FIG. 5 System output for type P messages—example #4
FIG. 6 System output for type P messages—example #5
FIG. 7 System output for type P messages—example #6
FIG. 8 System output for type A messages—example #7
FIG. 9 System output for type A messages—example #8
FIG. 10 System output for type A messages—example #9

DETAILED DESCRIPTION OF THE INVENTION

In this document we use the term 'message' to mean a) any text string or b) any color or black/white image or c) any audio wave pattern. The informational content of the text string is unrestricted and includes passwords, login names, card numbers and ordinary text. The information represented by the image is also unrestricted and this includes photographs, facial images, fingerprints, maps and weather patterns. Likewise, the informational content of an audio wave pattern is unrestricted and can represent human speech, music and periodic wave patterns such as those produced by sirens and the like.

The KAFKA software system is comprised of a main module and six function modules—a) a main or driver module which accepts user input and invokes other modules, b) a function to handle text messages, c) a function to handle audio waves, d) a function to handle image type messages, e) a function to compute the complex-valued Fibonacci values for sixteen different cases, f) a function to compute the modulo function for complex arguments, and g) a function to create a cellular automaton network and enable the cells in the network to interact. The block schematic of the KAFKA system is shown in FIG. 1. Detailed descriptions of the main module and the six functions are presented in the ensuing paragraphs.

The main module requires the user to initially provide the following inputs—name of the folder into which all results will be output, the type of message to be encrypted (0 for text, 1 for image and 2 for audio), and the contents of the message if it is a text message or the file name containing the image or the audio wave. Since the KAFKA system only handles square images, any user wishing to process rectangular image type messages should resize the image to square shape; proportional scaling but not cropping should be used to ensure valuable information is not lost. If the input is a text message, the function type_T_message is invoked. If the input is an image type message, the function type_P_message is invoked. If the input is an audio wave message, the function type_A_message is invoked. The value returned by any of these three functions is a square matrix called 'nodes' representing the input message. Image representations of these matrices are depicted in Figures A, B and C. In the case of an audio input message, a plot of the wave pattern is made available (Figure X).

Next, the user is asked to provide the two starting values for computing the Fibonacci series in the complex domain. The user is allowed to input any two random values. There is no restriction on the type of values the user is asked to provide—they may be integers, real values or complex values. There is no explicit restriction on the range of values either; any limits placed on the values would come from the limitations of the user's computer system on which KAFKA is implemented. The main module then invokes the function named complex_Fibonaee to compute the complex Fibonacci values for 16 possible sets. Since only 15 of these sets are relevant to our invention, the user is then asked to enter which of the 15 sets of values to use. Once the user has entered a number between 2 and 16, the main module invokes the function labelled Cellular_Automaton_8 to generate a complex key which is a 2-dimensional matrix. The actual encryption key is generated by computing the inverse of the phase component of this 2-d complex matrix. The decryption key is merely the inverse of the actual encryption key. Once the encryption key and its inverse have been computed, the main module displays the character and image representations of these two keys (see Figures X and Y). Using the encryption key, the main module then creates the encrypted version of the input message by pre-multiplying and post-multiplying the square matrix representing the input message by the encryption key. The encrypted version of the message is made available to the user in two forms—an image version and a character version (Figures X and Y respectively). Decryption of the encrypted message is done by pre-multiplying and post-multiplying the encrypted message using the decryption key. In the case of audio wave input messages, the encryption and decryption keys are also output in the form of wave patterns (Figures X and Y, respectively). Also, the user is provided the facility to play the encrypted and decrypted audio files.

Function type_T_message (msg, base): This function takes two inputs—'msg' (the one dimensional or linear text message) and 'base' (name of the output folder)—and returns a square image matrix. The size of the matrix is dependent on the length of the input text message. If M, the length of the message, is an exact square (say $N^2$), the matrix will be an N by N matrix. If M is not an exact square, a sufficient number of pad characters are appended to the message so that the new message length represents an exact square. The pad character used in the function is the '$' symbol. The (padded) message vector is then displayed. The characters in the (padded) message vector are assumed to be in Unicode. Next, the Unicode characters are replaced by their numeric values and the message vector is then reshaped into a matrix. The contents of this matrix are now displayed as an image, the image is written into the output folder and the matrix is returned to the driver or main program.

Function type_A_message (msg, base): This function takes two inputs—'msg' (the one dimensional or linear audio wave) and 'base' (name of the output folder)—and returns a square image matrix. The size of the matrix is dependent on the length of the input audio message. If M, the number of samples in the wave is an exact square (say $N^2$), the matrix will be an N by N matrix. If M is not an exact square, a sufficient number of zero sample values are appended to the audio message so that the new message length represents an exact square. The (padded) audio wave is then displayed and also stored in the output folder. The sample values in the (padded) audio wave are then converted to Unicode and displayed as a character string. Next, the audio wave message vector is reshaped into a matrix. The contents of this matrix are now displayed as an image, the image is written into the output folder and the matrix is returned to the driver or main program.

Function type_P_message (msg, base): This function takes two inputs—'msg' (a two-dimensional square image) and 'base' (name of the output folder)—and returns a square image matrix. The image is displayed and stored in the output folder. The values in the image matrix are then converted to Unicode and displayed as a character string. The image matrix is returned to the driver or main program. Note that the initial input image is not modified by the function.

Function complex_Fibonacci (a, b): This functions takes as input two values—'a' and 'b'- and returns 16 sets with each set containing 5 values. The two inputs, 'a' and 'b', are used in defining the initializing values for sixteen different Fibonacci recurrence equations. The first nine Fibonacci values are computed for each of these 16 distinctly different recurrence equations. The nine values in each set represent the weights to be used in manipulating the cells in the cellular automaton.

Function cmod (z, m): This function computes the modulus function as defined for a complex-valued argument 'z' and an integer base 'm'. The value that is returned is complex and it is defined as follows: result=z−floor(real part (z)/m)−i*floor(imaginary part (z)/m).

Function Cellular_Automaton_8 (series_number, dataset, fig): This function takes as input three arguments—'series_number' (which of the 16 Fibonacci sets is to be used), 'dataset' (the data for all 16 Fibonacci sets), and 'fig' (the square matrix representing the input message)—and returns a square matrix which contains the necessary information for computing the encryption and decryption keys. The size and structure of the cellular automation (hereinafter identified as CA) are the same as the matrix representing the input message. For a square matrix of size N, there are a total of N2 cells in the CA. Since there are N rows and N columns, each cell has a unique address specified by row number and column number.

Irrespective of a cell's location in the CA, each cell has 8 immediate neighbors (left, right, top, bottom, northwest, northeast, southwest, southeast). This is because the CA matrix is viewed as a wrap-around structure in which the first row is treated as being preceded by the last row and vice versa; likewise, the first column is treated as being preceded by the last column and vice versa. For example, the neighbors of cell(1, 1) are cell(1, N), cell(1, 2), cell(N, 1), cell(2, 1), cell(N, N), cell(2, 2), cell(2, N) and cell(N, 2). Given which one of the 16 Fibonacci sets is to be used, the values associated with that set are used in defining the weights of a cell and its immediate neighbors. Initially, the values in the CA are in one-to-one correspondence with the input square matrix. The cells in the CA are updated one at a time, left to right, and top to bottom starting with the cell in first row and first column.

The updated value of a cell is computed as shown below:

corners=ff*cell(i−1, j−1)+fz*cell(i+1, j+1)+fg*cell(i−1, j+1)+fh*cell(i+1, j−1);

edges=fd*cell(i−1, j)+fe*cell(i+1, j)+fb*cell(i, j−1)+fc*cell(i, j+1);

cell(i, j)=cmod((fa*cell(i, j)+corners+edges)/(fa+fb+fc+fd+fe+ff+fg+fh+fz), 256);

In the above, fa, fb, fc, fd, fe, ff, fg, fh, and fz are the nine Fibonacci values or weights in the set for a given complex Fibonacci series. The indices i and j take on values in the range [1, N]. For the special situations pertaining to corners and edges, when i=1 or j=1, index N is used since i−1 is zero and j−1 is zero; likewise, when I−N or j=N, index 1 is used since i+1 and j+1 both become N+1.

Points of Particular Interest

While both the KAFKA system and the Vernam technique employ 'one-time' pads as keys, there are distinct differences between the two methods. Unlike the Vernam technique, messages in KAFKA are not restricted to being text messages; they can also be image or audio waves. The key length in the KAFKA system is almost always longer than the length of the actual message and can, in the case of rectangular picture-type messages, be shorter. The value with which an item in the original message is substituted is changed several times, there is no cyclical or random shifting of characters, the key which constitutes the one-time pad is derived from a matrix of complex values and not just integers, and the original message is first recast into matrix form so as to be manipulated by a cellular automaton network, and cell interactions are based on complex-valued Fibonacci series values which serve as weights for a cell and its four immediate neighbors to the north, south, east and west.

The standard Fibonacci numbers which are all integers are obtained from the recurrence equation $$f_{n+2} = f_n + f_{n+1}$$

where n>=0 and the starting values are $f_0=1$ and $f_1=1$. In this application we define the Fibonacci numbers for complex numbers as follows:

$$f_{n+2} = c*f_n + d*f_{n+1}$$

with $f_0=a$ and $f_1=b$ and a, b, c and d are allowed to be complex, and $n>=0$.

Even though 16 sets of complex Fibonacci numbers are computed, set 1 is not used because all the values in the set are purely real and the angle associated with each value is zero if the user inputs purely real values for the two starting values. Computation of the encryption key in KAFKA is based on inverting a matrix associated with angular values of complex-valued elements of the matrix. Since the elements in the angle matrix obtained by using series 1 Fibonacci numbers are all zero if the two start values are both real, the matrix becomes singular and, therefore, cannot be inverted. Consequently, valid encryption and decryption keys cannot be generated. The correspondence between the nine weights in a Fibonacci series set and a cell and its eight immediate neighbors is as follows—(first Fibonacci weight—center cell), (second Fibonacci weight—left cell), (third Fibonacci weight—right cell), (fourth Fibonacci weight—cell above), (fifth Fibonacci weight—cell below), (sixth Fibonacci weight—cell in upper left), (seventh Fibonacci weight—upper right cell), (eighth Fibonacci weight—lower left cell, and (ninth Fibonacci weight—lower right cell). By selectively/arbitrarily setting the sixth, seventh, eighth and ninth weights to zero, a restricted four-neighborhood version of the cellular automaton is obtained. In this restrictive version, every cell only interacts with four other cells—cell above, cell below, cell to the left and cell to the right.

The invention claimed is:

1. A method for encrypting and decrypting messages using a cellular automaton network, the method comprising:
receiving an input message in the form of text or audio waves or pictures using a cellular automaton network; wherein each cell in the network interacts with all eight of its immediate neighbor cells; wherein each cell is weighted using a complex Fibonacci number; wherein the complex Fibonacci number is obtained from any one of 15 Fibonacci recurrence equations defined in complex numbers domain; wherein an output provided by the cellular automaton network is in the form of character strings or images or waveform patterns depending on the input message; and wherein, for each input message type selected from text, audio or video, a complex key, an encryption key and two decryption keys are generated;
wherein, the input message is reshaped into a square matrix representation, which defines an initial configuration of the cellular automaton network;
wherein, a final configuration of the cellular automaton network is obtained by weighting each cell in the matrix by a complex Fibonacci number and updating each cell value by having the cell interact with its 8 immediate neighbors: wherein, after all the cells have been updated, the contents of the cellular automaton network represent a complex key in the complex numbers domain;
wherein, the encryption key is generated by first splitting the complex key into a magnitude part and a phase part into a phase matrix and then obtaining an inverse of the phase matrix;
wherein, the generated encryption key is used to multiply the square matrix representation and generating an encrypted message as an encrypted image in an encrypted image format.

2. The method according to claim 1, wherein, for a text message of arbitrary length, the text message is reshaped into a square matrix representation using pad characters if needed and that this square matrix defines an initial configuration of the cellular automaton network.

3. The method according to claim 1, wherein, for a message in the form of an audio wave of arbitrary duration, the audio wave is reshaped into a square matrix representation using pad values of zero amplitude if needed and that this square matrix defines an initial configuration of the cellular automaton network.

4. The method according to claim 1, wherein, for a message in the form of an arbitrary size image, the image is resized if necessary into square shape and that this square matrix representation defines an initial configuration of the cellular automaton network.

5. The method according to claim 1, wherein the phase matrix-based encryption key is used to pre-multiply one or more times and post-multiply one or more times, the square matrix representing the initial configuration of the cellular automaton so as to generate an encrypted message in image format.

6. The method according to claim 1, wherein a decryption key is obtained by inverting the phase matrix-based encryption key.

7. The method according to claim 6, wherein the decryption key is used to pre-multiply and post-multiply the encrypted image to obtain a decrypted message as a decrypted image in a decrypted image format.

8. The method according to claim 7, wherein the decrypted image is reshaped into character format to obtain an original input message input in character form.

9. The method according to claim 7, wherein, the decrypted image is reshaped into wave format to obtain an original input message input in audio waveform.

10. The method according to claim 7, wherein, the decrypted image is the original message input in picture form.

* * * * *